May 7, 1935.  H. A. WEINLICH ET AL  2,000,203
CARD VERIFIER
Filed June 5, 1930   3 Sheets-Sheet 1
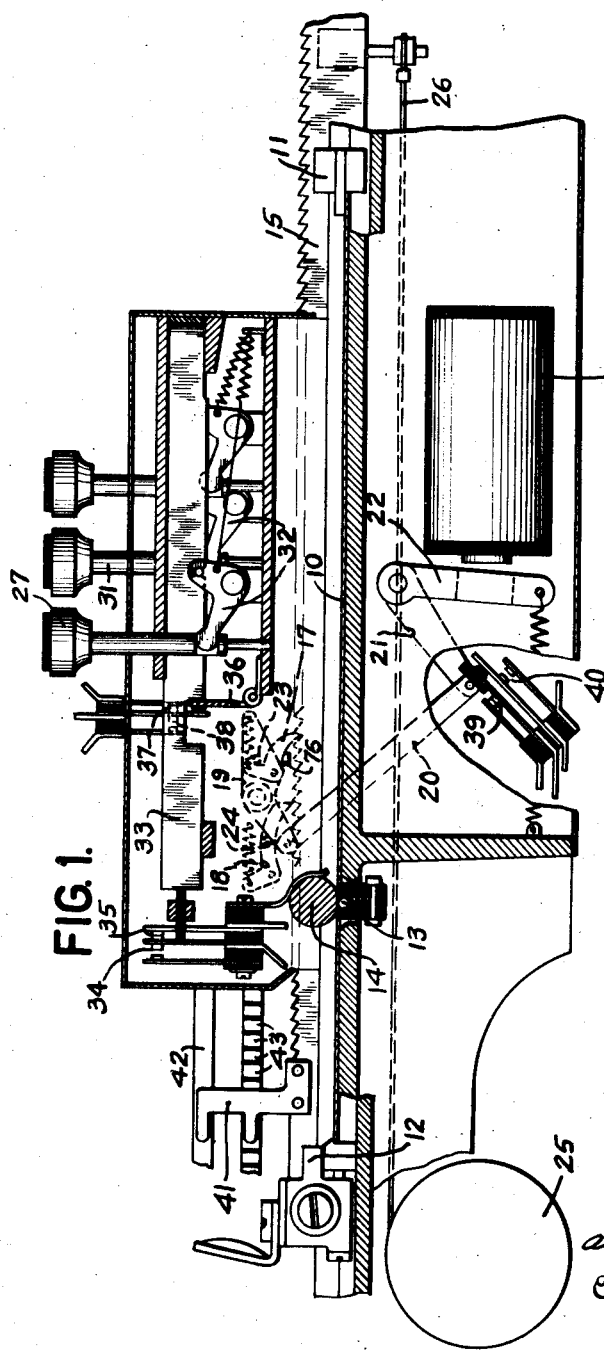
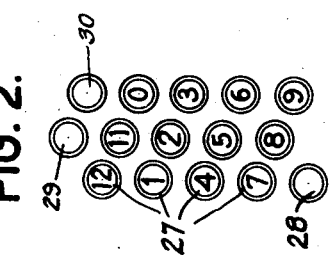
Inventors
Hermann A. Weinlich
and Ulrich Holm
by their
Attorney

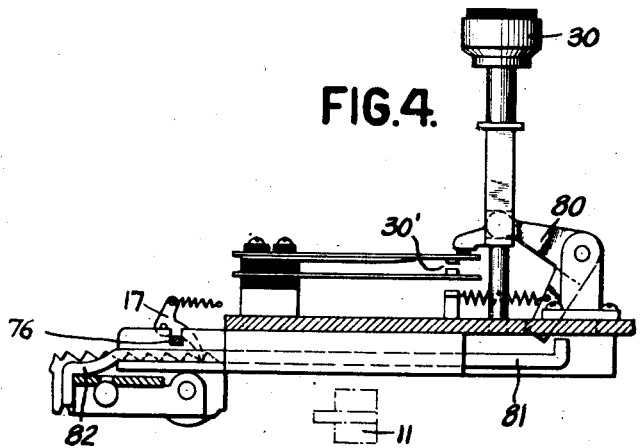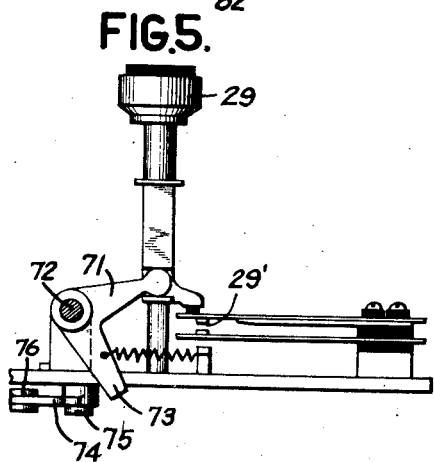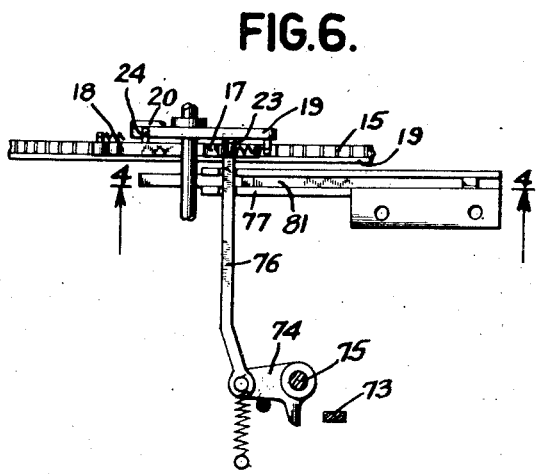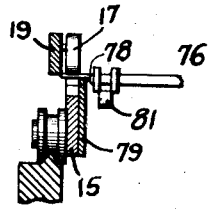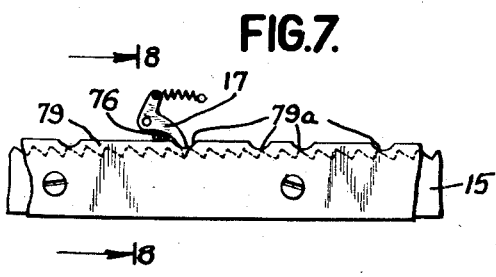

Patented May 7, 1935

2,000,203

UNITED STATES PATENT OFFICE 2,000,203

CARD VERIFIER

Hermann Adalbert Weinlich and Ulrich Kölm, Berlin, Germany, assignor, by mesne assignments, to International Business Machines Corporation, New York, N. Y., a corporation of New York Application June 5, 1930, Serial No. 459,401
In Germany December 24, 1929

8 Claims. (Cl. 73—51)

This invention relates to certain new and useful improvements in verifying machines.

In tabulating machine work, data are tabulated by punching differentially spaced holes on record cards. The machine for carrying out the punching operation may be the Schaaff machine shown in Patent No. 1,134,018. In this machine the punching operation is performed by depressing certain keys. Operators using the machine sometimes depress the wrong key and incorrect data are then tabulated upon the card. It has therefore been found that usually the punched cards must be checked to determine if any errors have been made. Often this checking is done by a visual inspection of the cards but this method of checking has been found unsatisfactory as the checker is liable to make the same error that was originally made by the operator who punched the card. Also the visual checking is a tedious and time consuming operation.

The present invention is directed to a machine in which the punched cards may be placed and the errors detected. The operation of checking is exceedingly rapid and the possibility of checkers' errors being identical with punching operators' errors is largely eliminated.

The verifying machine is provided with keys similar to those in the card punching machine and the checker operates the keys just as if a a new card were being punched. If a card is correctly punched the record card carriage feeds forward upon the depression of each key; but if a punch hole is incorrectly spaced in the card, the carriage does not feed forward; thereby apprising the checker of the error in the card.

Heretofore in verifying machines, mechanical devices have been employed to sense the card to detect the presence or absence of a perforation. One of the objects of the present invention is to provide electrical card sensing devices for determining the correctness of the perforations in the card.

In its preferred form the invention consists of a set of independent sensing balls adapted to make contact with a common contact roller through the perforations in the card.

Another object of the invention is to provide mechanism for detecting erroneous punching in a card field passing the verifying devices under control of a skip or release key.

A further object is to permit verification of a card in motion to detect the presence of a perforation in a field which is being skipped due to depression of a tabulating key.

Also where a card having combinational punching i. e. a card perforated with two or more holes in a single column is being verified it will be necessary to depress the several keys corresponding to the several index positions of the combination being checked.

Various other objects and advantages of the invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 1 is a section through the card feeding and analyzing devices of the machine.

Fig. 2 is a detail view of the arrangement of the keys.

Fig. 4 is a detail of the card carriage release key.

Fig. 5 is a detail of the tabulating key.

Fig. 6 is a plan detail of the escapement rack and release mechanism.

Fig. 7 is a detail of the tabulating plate and escapement rack.

Fig. 8 is a section on line 8—8 of Fig. 7.

Card feeding mechanism

Figure 3:
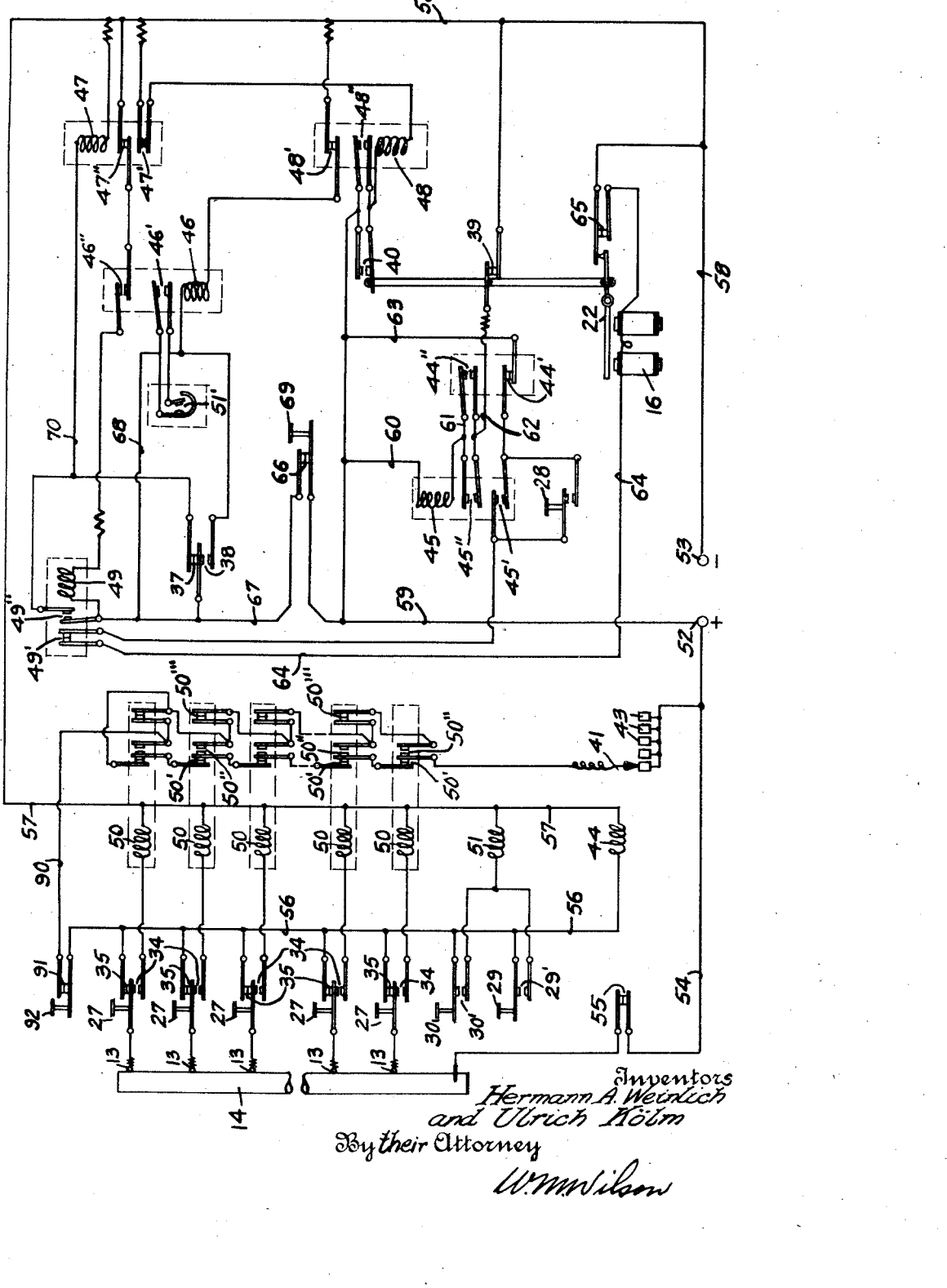
Fig. 3 is a wiring diagram of the electric circuit of the machine.

The record card to be verified is inserted between a card pusher 11 and a forward guide 12 with the first column of the card coinciding with a column of spring pressed contact balls 13 adapted to make contact through holes in the card with a common roller 14 insulated from the frame of the machine. The pusher 11 and guide 12 are attached to the rack bar 15 which is suitably guided for horizontal movement. The circuits established between the balls 13 and the roller 14 through perforations in the card will, in the manner to be described, cause energization of a magnet 16 to control the movement of the card rack 15. The movement of the rack is controlled by an escape mechanism comprising pawls 17 and 18. The pawl 17 is pivotally mounted upon the member 19 which is connected by a link 20 and arm 21 to the armature 22 of the magnet 16. The pawl 17 is spring pressed against a pin 23 in the member 19 and is adapted normally to be in engagement with the teeth of rack bar 15 while the spring pressed pawl 18 is normally held in the position of Fig. 1 through the cooperation of a pin 24 with the upper edge of the member 19.

A spring barrel 25 is provided which has a tape 26 connected to the rack bar 15, as shown, and which tends to urge said bar to the left. Energization of magnet 16 will rock member 19 counterclockwise about its pivot to lower pawl 18 into engagement with the teeth of rack 15 so as to hold the rack in position while the pawl 17 is raised out of engagement therewith.

Deenergization of the magnet 16 will permit clockwise rotation of the member 19 in such manner that the pawl 17 will be lowered into engagement with the next succeeding tooth on the rack bar, thus permitting step by step advance of the card.

Above the card carriage is the customary key board having the usual twelve verifying keys 27, a skip key 28, a tabulating key 29 and a release key 30. The keys 27 are all alike and have their stems 31 cooperating with pivoted bell crank members 32 which in turn have pin and slot connection with slides 33. Depression of a key 27 will cause movement to the left of its corresponding slide 33 to close a corresponding pair of contacts 34 and open contacts 35, the function of which will be explained in connection with the electric circuit. A pivoted bail 36 extending beneath the slides 33 cooperates with notches therein and at one end cooperates with the spring blade of a pair of contacts 37, 38 so that the operation of any key 27 will in addition to closing its associated contacts 34, 35, also close contacts 38 and open contacts 37. A further set of contacts 39 and 40 are adapted to be shifted upon energization of magnet 16 through a pin located in the extremity of arm 21.

The card rack 15 carries a spring contact blade 41 which is adapted to make connection between a common strip 42 and a series of insulated inserts 43 rigidly secured to a fixed portion of the machine. The inserts 43 may be so arranged as to be engaged by the spring 41 at the time when a portion of the card containing combination or multiple hole perforations is being sensed by the contact balls 13. At such time the circuits controlled by the common strip 42 and the inserts 43 will affect the operation of the device in a manner to be explained later.

*Wiring diagram*

Referring now to the electric circuit of the machine (Fig. 3) there are provided a number of relays 44, 45, 46, 47, 48, 49 and a series of relays 50, one for each key 27. A further relay 51 is associated with the keys 29 and 30. The contacts associated with the various relays will for convenience be designated with the same number as the relay followed by a prime, double prime, or triple prime, as the case may be.

Current is introduced through the terminals 52 and 53. Current is supplied to the common roller 14 from the terminal 52 through a wire 54 and a normally closed contact 55. Current normally flows from the roller 14 through contacts 35, wire 56, relay coil 44, wires 57 and 58, back to terminal 53. If there is a perforation in the card column in line with the balls 13 and roller 14, the circuit just traced will follow through the contact 35 corresponding to the index point position in which the perforation occurs. Such energization of magnet 44 will cause the opening of its associated contact 44' and the closure of 44" which causes the energization of relay coil 45 through a circuit from terminal 52, wire 59, wire 60, coil 45, wire 61, contacts 44", wire 62, contact 39, wire 58, back to terminal 53.

This causes closure of the contacts 45' and 45" the latter forming a holding circuit for relay 45 from the terminal 52 through relay coil 45, contact 45", wire 62, contact 39, wire 58 to terminal 53. This holding circuit becomes effective as soon as the contacts 44' are opened. This opening of the contacts 44" is effected upon depression of the key 27 corresponding to the index point position in which the perforation occurs. Depression of such key opens the corresponding contact 35 thereby breaking the circuit to the relay coil 44 and consequently permits contacts 44" to open. The closure of the contacts 45' and the reclosure of contacts 44' initiate a circuit through the escape magnet 16 to permit the card carriage to be advanced one step. This circuit follows from the terminal 52 through wire 59, wire 63, contact 44' which is now closed, contact 45', relay contact 49', wire 64, magnet 16, armature contact 65, wire 58 back to terminal 53. Attraction of the armature 22 will cause opening of the contact 39 to deenergize the relay 45 thereby opening the contacts 45' and 45".

If the key which is depressed does not correspond to the index point position of the perforation in the card column under the sensing balls, the relay coil 44 will not become deenergized and its contact 44' will therefore remain open, so that the circuit through magnet 16 cannot be completed. Consequently the card carriage will not escape and the operator will know that an incorrect perforation has been made in the particular card column.

If there is no perforation at all in a particular card column, the relay coil 44 will not be energized upon presentation of this column to the analyzing balls and consequently upon depression of a key the relay coil 45 will also remain in a state of deenergization due to the open condition of contacts 44". Failure of the card rack to escape will again apprise the operator that there is an inconsistency between the card column and the key set up.

Where there is no perforation in a card column, depression of skip key 28 by closing its contact will complete a circuit from terminal 52, wires 59 and 63, contact 44' now closed, contact of key 28, contact 49', wire 64, magnet 16, contact 65, wire 58, back to terminal 53.

If the key depressed corresponds with the position of a perforation in the card column but in addition there is a further perforation in the same column, the relay coil 44 upon depression of the key corresponding with the first mentioned perforation will not become deenergized since the circuit therethrough is maintained through the ball 13 and the extra perforation. Contacts 44' will not close to initiate the circuit to the magnet 16 as traced above.

As mentioned in connection with Fig. 1, depression of any key 27 will cause shifting of contacts 37, 38 from the position shown. Closure of contact 38 causes energization of relay coil 46 through the following circuit: from the terminal 52, through wire 59, contact 66, wire 67, contact 38, coil 46, contact 48' now closed, wire 58, back to terminal 53.

Energization of the coil 46 closes the associated contacts 46' and 46" of which the contact 46' establishes a holding circuit for its coil from terminal 52, wire 59, contact 66, wire 67, wire 68, contact 46', coil 46, contact 48', wire 58 to terminal 53. Coil 46 is deenergized upon the opening of either contacts 48' or contacts 66. Contact 66 is opened by depression of key 69 which is an error key and is depressed to open the contact whenever there is a non-comparison between the perforations in the card and the selected key 27. Contact 48' is opened upon energization of its coil 48 which occurs upon each energization of magnet 16, through the contact 40 controlled by the armature of the magnet, in a manner explained in connection with Fig. 1. This circuit may be traced from the terminal 52, through the wire 59, contact 40, relay coil 48, contact 47', wire 58 to terminal 53. The contact 47' of this circuit is opened whenever its controlling coil 47 is energized. Energization of coil 48 is maintained by a holding circuit established by contact 48'' from the terminal 52, through the contacts 48''', coil 48, contact 47' back to the other terminal. Concurrently the contact 48' is opened to deenergize the holding circuit of relay coil 46.

It may here be stated that with the machine at rest the coil 47 is energized, the circuit running from terminal 52, through wire 59, contact 66, wire 67, contact 37 normally closed, coil 47, wire 58, back to terminal 53. This causes closure of the contacts 47'' and opening of contact 47' so that when relay coil 46 is energized as heretofore traced, the closure of its contacts 46'' will energize the relay coil 49 from terminal 52, contact 66, coil 49, contact 46'', contact 47'' now closed, back to the other terminal.

Briefly reviewing the operation thus far, with no key depressed, magnet 47 is energized to hold its contacts in the position of Fig. 3. Upon actuation of a key 27, the magnet becomes deenergized, closing contact 47' and opening contact 47''. It has also been shown that a key depression closes contact 46'' by energizing magnet 46 and forming a stick-circuit therefor. If there is a non-comparison between the hole punched and the key depressed, there will be a consequent failure to energize escape magnet 16 and contact 40 will not close to energize magnet 48.

Therefore, when the key 27 is released, the stick-circuit through magnet 46 will still be active to hold contact 46'' closed. Closure of contact 37 again energizes magnet 47 to close contact 47'' which, being in series with contact 46'' establishes a circuit from terminal 52, wire 59, contact 66, wire 67, coil 49, contacts 46'', 47'', wire 58, back to terminal 53. This causes closure of contact 49'' and opening of contact 49'. A holding circuit now follows from line 67, contact 49'', wire 70, coil 47, wire 58, to terminal 53.

Depression of a key 27 at this time will have no effect, since opening of contact 37 will not deenergize coil 47. With contact 49' held open no circuit can be completed through magnet 16. This inability of the machine to respond to a key depression is a signal to the operator that there has been a non-verification in the column under consideration. Depression of error key 69 at this time will deenergize coils 46, 47 and 49 and contact 49' will again close and the card may be advanced by depression of the correct key 27 or it may be removed from the machine.

Tabular key

When it is desired to skip a plurality of columns of the card where such columns are in a blank or unperforated field, the key 29 is depressed (see Fig. 5). This key is mounted for vertical movement in the frame of the machine and is adapted to rock an arm 71 secured to a rod 72 which also carries a depending arm 73 which free end is adapted to engage an arm on bell crank 74 (see also Fig. 6) pivoted at 75. Pivoted to one arm of the bell crank is a rod 76 guided by a notched plate 77. The free end of rod 76 lies under the escapement pawl 17 (see also Figs. 7 and 8) and is also bevelled as at 78 where it cooperates with a notched plate 79 secured to the rack 15. The operation is such that upon depression of key 29 the rod 76 is moved to the left as viewed in Fig. 8 whereupon the bevel 78 will cooperate with the upper edge of plate 79 to raise the pawl 17 out of the teeth of rack 15. This frees the rack to escape under the influence of its spring drum until a notch 79a has moved into alinement with the rod 76. The rod will drop into this notch and permit the pawl 17 to reengage the rack 15. The plate 79 is notched in conformity with the particular arrangement of fields on the cards being verified, and the notches are so located as to interrupt the movement of the rack to the left after a field has been skipped. The machine is adapted to detect the presence of a perforation in a field being so skipped and for this purpose the key 29 is adapted to close, upon depression, a contact 29' which as we have seen energizes the magnet 51 causing its relay points 51' to close. The closure of points 51' establishes a circuit from terminal 52, wire 59, contact 66, wires 67, 68, contacts 51', magnet 46, contact 48', wire 58, back to terminal 53. The magnet 46 thus energized closes its contact 46' forming its own holding circuit and also closes the contact 46''. Since the contacts 47'' are closed at this time, the closure of contact 46'' will complete the circuit through the magnet 49 as already traced, opening the contact 49' so that when the operator resumes column by column verification after a field has been skipped, the machine will not be responsive to depression of a key 27, thus indicating that there has been some erroneous punching in a supposedly blank field.

Release key

Where the blank field to be skipped occurs at the right end of the card, the release key 30 may be depressed to escape the carriage to its extreme position. In Fig. 4 depression of key 30 will rock a pivoted bell crank 80 to move a slider 81 to the right so that a cam surface 82 cooperating with a fixed portion of the machine will move the slider 81 upwardly against the rod 76 (see also Fig. 6) thus rocking the pawl 17 out of engagement with the rack 15. The pawl will be held in such raised position until the carriage has moved to its extreme left position wherein the pusher 11 will engage a lateral projection of slider 81 to restore it to its normal position. Key 30 will close its associated contact 30' which is wired in parallel with the contact 29 and will cause locking of the escape mechanism in the same manner. That is, if there is a perforation in such blank field, the circuit will run from terminal 52, wire 54, roller 14 to the contact ball 13 in line with the hole contact 35, wire 56, contact 29', magnet 51, wires 57 and 58, back to terminal 53.

Combination or multiple holes

Associated with each of the keys 27, as has already been mentioned, is a relay coil 50 having associated contacts 50', 50'' and 50'''. In Fig. 1 the insulated commutator inserts 43 are positioned so they cooperate with the contact finger 41 in the field of the card in which multiple perforations have been punched. This field of the card may contain combinations of two or more perforations in a card column or the character represented may be indicated by a single perforation. The various keys 27 corresponding to the index point positions involved in a combination will be simultaneously depressed and if the keys selected correspond with the holes punched, the card carriage will be escaped to the next column. The object of the key depression, as we have heretofore seen, has been to deenergize the magnet 44 and the object of the relays 50 is to prevent such deenergization in combination hole columns unless two correct keys are depressed. For example assume a combination perforation involving the uppermost and lowermost keys 27 as shown in Fig. 3.

Depression of the lowermost key alone would cause energization of its coil 50 and shifting of its contacts 50′, 50″ so that a circuit would flow from terminal 52 to the segment 43 of the column being verified, to slider 41, contact 50″ to contact 50‴′ of the next adjacent key and thence serially through all the contacts 50‴′ to the position of the uppermost index point. If in this uppermost position the key 27 were depressed and a hole were presented, its magnet 50 would also be energized to open its contact 50‴′ and the circuit just traced would be interrupted at this point and no circuit would be completed to the line 56 of magnet 44. Depression of only one of the keys involved in the combination would permit the circuit to continue through line 90, contact 91, wire 56, coil 44, wires 57, 58 back to terminal 53. Where the combinational field contains a single hole perforation, the depression of the key 27 corresponding to the position of the hole will be accompanied by depression of key 92 to open its contact 91, thereby disconnecting the various contacts 50′, 50″, 50‴′ from the circuit and if the hole position is correct, the magnet 44 would become energized in the now familiar manner. During this operation of verifying combinational holes, it will be understood, of course, that any superfluous perforations will still keep the magnet 44 energized through the wire 54 and roller 14 as previously, so that where such superfluous holes occur, the machine will be locked against operation. Also where a character represented by a multiple perforation has only one of such holes punched the depression of the single key corresponding thereto will not break the circuit to magnet 44.

A general statement of the operation of the device will now be given. If there is a hole in the card column in line with the balls 13 in rollers 14, the circuits is completed through the contacts 35 corresponding to the hole position in which the hole occurs. Magnet 44 is thus energized and opens its contacts 44′ and closes its contacts 44″, the closure of which energizes the relay coil 45 through the normally closed contacts 39. The coil 45 then closes the contacts 45′, 45″, the latter forming a holding circuit for the relay coil 45. This holding circuit becomes effective as soon as the contacts 44″ are opened and this occurs on the depression of the key 27 corresponding to the hole position in which the hole occurs in the card, because depression of the key opens the corresponding contacts 35 and breaks the circuit through the relay coil 44 which is to be deenergized. The contacts 44′ and the contacts 45′ being both now closed a circuit is established through the magnet 16 by way of the normally closed contacts 49′ and 65 to permit the card carriage to be advanced one step. The armature 22 of the magnet 16 is attracted and opens the contacts 39 to deenergize the relay 45 and allow the contacts 45′, 45″ to open. This is the normal operation of the machine during each verifying stage when the hole configuration of the column being verified corresponds with the key depressed.

If the key which is depressed does not correspond to the position of the hole in the card column being verified or if it does correspond but there is an additional or incorrect hole in the card, the opening of the contacts 35 does not deenergize the relay coil 44. Consequently, the contacts 44′ are held open so that the magnet 16 cannot be energized and the card carriage is not released. If there is no hole in the column, the relay coil is not energized so that coil 45 remains deenergized and contacts 45′ remain open. Once again the magnet 16 is not energized and the card carriage fails to escape.

When a card column should properly be blank, the skip key 28 is depressed and its contacts are closed. If there is no hole in the column, the relay coil 44 will not be energized. Consequently, a circuit will be completed to the escape magnet 16. If, however, there is a hole in the skipped column, relay coil 44 will be energized and the contacts 44′ opened so that no circuit could be completed through the escapement magnet. Depression of the key 28 would therefore have little effect.

The circuits of the machine are arranged so that if any key is depressed and released without the magnet 16 being energized, the relay contacts 49′ are opened to interrupt the circuit from the escape magnet 16 and are held open until the error key 69 is depressed. In this connection it is to be noted that the contacts 37, 38 are operated when any of the keys 27 are depressed or when the skip key 28 is depressed. Where blank fields occur in the card being verified and it is not desired to advance the card in a step-by-step manner to the next field containing entries, the blank field may be skipped under control of the tabulator key 29 or where the blank field occurs at the right end of the card, by the release key 30. Either of these keys will in the conventional manner release the escapement mechanism to permit the rapid advance of the card, the keys being manually held depressed during such movement of the card. If during this rapid advance of the card a perforation should be present in a field which should properly be blank, a circuit will immediately be established through the corresponding contact 35 to energize the relay 44. This in the now familiar manner will cause energization of the coil 45 and the establishment of a holding circuit for this coil which will continue to hold indefinitely. The energization of coil 51 coincident with the depression of the tabulator key 29 or release key 30 will establish the circuits heretofore traced to cause the opening of contacts 49′ and the maintenance thereof in open condition so that following the rapid advance of the card to its next verifying position depression of any key 27 will not be adequate to complete the circuit to the magnet 16. If the blank field occurs at the right end of the card, and there should be a perforation therein which is detected as the field is skipped, the contact 49′ will be opened and maintained in such condition until after the next card has been inserted in the machine and the operator attempts to resume varifying operations. Due to the open condition of contact 49′ it will be found that depression of a verifying key 27 is not adequate to complete the escapement magnet circuit. This will indicate to the operator that a perforation exists somewhere in the supposedly blank field which has been skipped. Depression of error key 69 will return the relay coils to normal position so that verification may be renewed under control of the keys 27.

When fields containing multiple hole combination punchings are being verified, the relay devices 58 come into play to insure the depression of more than one key when any column is being verified.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims:

1. In a verifying machine, analyzing devices adapted to sense perforations in the columns of a record card, means for advancing a record card past said analyzing devices, keys, means jointly controlled by said analyzing devices and said keys for causing said advancing means to advance the record card column by column, a skip key adapted to cause said advancing means to uninterruptedly advance a plurality of card columns past said analyzing devices and means controlled by said analyzing devices upon sensing a perforation in any of said plurality of columns for suppressing further operation of said advancing means.

2. In a verifying machine, analyzing devices adapted to sense perforations in the columns of a record card, means for advancing a record card past said analyzing devices, skip key mechanism adapted to cause said advancing means to advance a predetermined number of card columns less than the total number of card columns past said analyzing devices with an uninterrupted movement, and means controlled by said analyzing devices in respose to a perforation in any of said predetermined columns for preventing further operation of said advancing means.

3. In a machine adapted to verify index points of a card column, a relay associated with a plurality of index points, means cooperating with a hole in the card to energize said relay, a plurality of keys one for each index point, means operative upon actuation of the key corresponding to the index point in which a hole occurs, to deenergize said relay and means controlled by the actuation of any other of said keys for preventing deenergization of said relay upon subsequent depression of the correct key.

4. In an electric verifying machine, a card carrier, an escapement mechanism therefor, a magnet to operate the same, card sensing means and keys, one for each index point position of a card column, a circuit including a relay completed under control of said sensing means upon sensing a perforation in a card column, a second circuit, including a relay, completed by any of said keys upon operation thereof, and a third circuit including contacts controlled by the relays in said first two circuits for controlling the operation of said magnet.

5. The invention set forth in claim 4 in which contacts are provided in said first two circuits, and operated upon energization of said magnet to break said first two circuits.

6. In an electric verifying machine, means for analyzing a card, column by column, a relay, means for energizing said relay upon presentation of a hole in any index position of a card column to said analyzing means, a series of keys, means operative upon actuation of a key corresponding to the index position in which there is a perforation for deenergizing said relay and means controlled by the actuation of any other of said keys for preventing deenergization of said relay upon subsequent depression of the correct key.

7. In an electric verifying machine, means for sensing multiple perforations in a column of a record card, a series of keys, one for each index point position, means jointly controlled by said sensing means and said keys for verifying the perforations in the record card and means requiring actuation of more than one key to operate said verifying means.

8. In an electric verifying machine, means for sensing perforations in a plurality of index point positions of a column of a record card, circuits completed through said perforation by each sensing means, means including keys one for each perforation position adapted to open said circuits when depressed in accordance with the location of said perforations and means for preventing opening of all of said circuits until more than one of said keys are depressed.

HERMANN ADALBERT WEINLICH.
ULRICH KÖLM.